United States Patent Office 3,149,095
Patented Sept. 15, 1964

3,149,095
PROCESS FOR THE PURIFICATION OF POLYAMIDES
Giacomo Cerutti, Gozzano, Italy, assignor to Bemberg S.p.A., Milan, Italy, a limited liability company of Italy
No Drawing. Filed Aug. 7, 1961, Ser. No. 129,570
Claims priority, application Netherlands Aug. 24, 1960
10 Claims. (Cl. 260—78)

This invention relates to a process for the purification of polymerized aminocarboxylic acids, and relates more particularly to a new and novel washing process for the purification of polyamides whereby monomeric and low molecular weight compounds are removed from the polyamide.

Filament-forming linear polyamides from amino-carboxylic acids or their polyamide-forming derivatives, such as lactams, alone and from mixtures of these materials with other polyamide-forming materials, such as diamines and dicarboxylic acids, usually contain a certain amount of unchanged amino-carboxylic acids or low molecular weight condensation products which exude during storage or during working up, for example, during the spinning of melts to thin threads thereby giving the polyamides an undesirable appearance. This can have an extremely deleterious effect due to the formation of vapours, especially of lactam vapours, and in the case of rather high content of vapourizable materials, can make the working up practically impossible.

It is a familiar practice in the prior art to utilize various types of washing treatments to reduce the content of the monomeric and low molecular weight compounds in the polyamides to a suitably low amount. The polyamides are usually converted into chip form and boiled in water or the chips are washed for several hours with a stream of boiling hot water. The water, may in both washing treatments, possibly contain a small amount of a reducing agent such as hydrogen sulphite or sulphur dioxide. Nevertheless, the prior art washing processes suffer from the disadvantage that a yellow coloration or a deterioration of the polyamide easily occurs after treatment, which not only effects the apearance of the polyamide but also reduces the mechanical properties of objects produced therefrom.

It has now been found in accordance with the present invention that such disadvantages as yellow coloration or deterioration of polyamides by treatment with hot water can be prevented in a technically simple and advantageous manner, that is, this invention consists in bubbling an inert gas, preferably nitrogen, through a mixture of the hot water and polyamides during the washing treatment. Therefore, an object of the present invention is to provide a novel process for the purification of polymerized aminocarboxylic acids.

Another object is to provide a process for the purification of filament-forming linear polyamides.

Still another object of the present invention is to provide a novel washing process for purifying polymers of the polyamide type which process prevents the polyamides purified from deteriorating (being pulverized) or discoloring.

Still a further object of the present invention is to provide a novel washing process for the purification of polyamides, whereby monomeric and low molecular weight compounds are removed from the polyamides.

Further objects and advantages of the invention will be apparent from the following detailed description in which certain illustrative embodiments of the invention are described, it being understood that modifications and variations from the specific embodiments selected for illustration are contemplated within the scope of the appended claims.

Thus, according to the present invention inert gas (e.g., nitrogen gas) is caused to be bubbled through a hot washing solution for the polyamides, whereby oxidation of the polyamides is prevented. Moreover, it has been found that the gas bubbles formed during the washing process of this invention set up such a motion in the extraction mixture that the washing action is stimulated.

Generally, in commercial practice, upon completion of the washing treatment the washing liquid is usually discharged from the washing vessel before the polyamides have been removed, whereby air may be sucked in among the polyamide particles and result in oxidation of the polyamides.

However, in accordance with the process of the present invention, the inert gas replaces the separated washing liquid when drained from the polymer and in this way the polyamides do not come in contact with the oxygen in the air if they are maintained at a relatively high temperature.

At the completion of the novel washing treatment, according to this invention, the mixture of polyamides and washing liquid is not first cooled, but rather the wash water is run off from the purified polyamide while still hot.

The novel washing treatment of the present invention may be carried out in more than one step. Accordingly, in a two step wash treatment, the inert gas, which comes in full contact among the polyamide particles, while the used washing water is drained, is expelled at the start of the second wash step by the fresh water that is admitted into the washing vessel.

In accordance with the new process of this invention, after the washing water used in the last step of the washing process has been discharged, it is preferred that the finely divided polyamide be kept in contact with the inert gas until the temperature has been reduced to below about 60° C.

Moreover, in carrying ou the novel wash treatment of the present invention, closed vessels are preferred for they keep the oxygen in the atmosphere out of contact with the polyamides to be purified. Also, the supply and discharge of the inert gas used is controlled so that, preferably, there is a small overpressure in the washing vessel.

The invention will be further understood from the following illustrative example but is not to be construed as limiting same:

*Example 1*

1000 parts by weight of polymerized aminocaproic acid, in the form of granules, were washed with 1000 parts by weight of pure water at a temperature of about 95° C. During this washing treatment, taking place in a closed vessel, the water was pumped through the washing vessel so that the water flowed from the bottom of the vessel upwardly. Outside the washing vessel the circulating washing liquid was kept at the required temperature by means of a heat exchanger. Thereafter, the nitrogen was fed into the washing vessel under pressure near the bottom of the washing vessel at a rate of 20 litres to 100 litres of liquid/hour. Then the nitrogen was discharged at the top of the washing vessel.

After the washing treatment had lasted approximately 2 hours, the pump was stopped and the washing liquid discharged through a line connected to the vessel near the bottom of same. Then by supplying an additional amount of nitrogen the space over the escaping washing liquid was filled up with nitrogen, whereby it was fed in through a line connected to the top of the washing vessel. After the washing liquid had run off, the discharge line was closed and the supply of additional nitrogen gas stopped. Thereafter, pure washing water of 95° C. was supplied to the vessel. The washing treatment with the nitrogen gas being passed through said wash was repeated.

After two hours the washing liquid was again discharged utilizing the same procedure as described above. The second washing treatment was still followed by a third and a fourth washing treatment with pure water at 95° C. On completion of said last washing treatment the polyamide granules were transferred to a vacuum-dryer in which they were dried.

The polyamides, so treated in accordance with the present invention, showed no signs of turning yellow; nor did they fluoresce when exposed to ultra-violet light, which does occur when the polyamides are somewhat oxidized.

The content of water-soluble substances of the polyamide was approximately 1.0% by weight.

A washing temperature of 95° C. was used in the above example; however, the novel process of this invention is not limited to this temperature. A temperature range of between 60 to 120° C. wherein water is used as the washing agent is the preferred temperature range for the washing treatment in this invention.

The amount of the inert gas passing through the washing liquid, in accordance with this process, may vary within wide limits. However, the bubbles of the inert gas should pass through the entire washing liquid, for example, approximately 10 litres of gas to 100 litres of liquid/hour. With a value higher than 50 litres of gas to 100 litres of liquid/hour no additional or superior washing effect is to be expected which would justify, from an economic point of view, the use of larger quantities of inert gas.

It is to be understood that the foregoing detailed description is given merely by way of illustration and that many variations may be made therein without departing from the spirit of this invention.

The invention is hereby claimed as follows:

1. A method for the purification of an impure solid, filament-forming linear polyamide containing a polyamide-forming monomer and low molecular weight polyamides as impurities which comprises washing particles of said solid polyamide with water at an elevated temperature and, during said water washing step, bubbling a gas inert with respect to said solid polyamide through said water to contact said polyamide particles to effect the removal of substntially all of said monomer and said low molecular weight polyamide from said solid polyamide.

2. The method according to claim 1 wherein said water washing step is carried out at a temperature in the range of from about 60° to 120° C.

3. The method according to claim 1 wherein said filament-forming linear polyamide is polyaminocaproic acid.

4. The method according to claim 1 wherein said inert gas is nitrogen.

5. A method for the purification of an impure solid, filament-forming linear polyamide containing a polyamide-forming monomer and low molecular weight polyamides as impurities which comprises washing particles of said solid polyamide with water at an elevated temperature, during said water washing step bubbling a gas inert with respect to said solid polyamide through said water to contact said polyamide particles to effect the removal of substantially all of said monomer and said low-molecular weight polyamides from said solid polyamide, and thereafter separating said water from said polyamide particles in an atmosphere of said inert gas to provide non-discolored solid polyamide particles.

6. The method according to claim 5 wherein said water washing step is carried out at a temperature from about 60° to 120° C.

7. The method according ot claim 5 wherein said filament-forming linear polyamide is polyaminocaproic acid.

8. The method according to claim 5 wherein said inert gas is nitrogen.

9. The method according to claim 5 wherein subsequent to said separation of said water from said polyamide particles said polyamide particles are maintained in said inert gas atmosphere and cooled to a temperature below about 60° C.

10. A method for the purification of impure solid, filament-forming polyaminocaproic acid containing monomeric aminocaproic acid and low-molecular weight polyaminocaproic acid as impurities which comprises washing particles of said solid polyaminocaproic acid with water at a temperature of from about 60° to 120° C., during said water washing step bubbling nitrogen gas through said water to contact said polyaminocaproic acid particles and to effect the removal of said monomeric aminocaproic acid and said low-molecular weight polyaminocaproic acid from said solid polyaminocaproic acid, thereafter separating said water from said polyaminocaproic acid particles in an atmosphere of nitrogen and cooling said polyaminocaproic acid particles from which said water has been separated to a temperature of below about 60° C., while maintaining same in said nitrogen atmosphere.

References Cited in the file of this patent

UNITED STATES PATENTS

| | | |
|---|---|---|
| 2,867,805 | Ludewig | Jan. 6, 1959 |
| 2,887,470 | Muench et al. | May 19, 1959 |
| 2,923,699 | Indest et al. | Feb. 2, 1960 |
| 2,978,439 | Kersting | Apr. 4, 1961 |
| 2,987,506 | Lum | June 6, 1961 |
| 3,015,651 | Kjellmark | Jan. 2, 1962 |
| 3,047,565 | Braun et al. | July 31, 1962 |

FOREIGN PATENTS

| | | |
|---|---|---|
| 1,243,538 | France | Sept. 5, 1960 |

OTHER REFERENCES

The Handbook of Plastics, 2nd ed., Simonds, Weith and Bigelow, D. Van Nostrand Co., Inc., New York, 1949, (pages 1051–1052 relied on).

Plastics Manual, 1st ed., The Scientific Press Ltd., 1960, (pages 57–58 relied on).